(12) United States Patent
Huang

(10) Patent No.: US 9,832,148 B2
(45) Date of Patent: Nov. 28, 2017

(54) SYSTEM AND METHOD FOR ATTACHING A REMOTELY STORED ATTACHMENT TO AN EMAIL

(71) Applicant: AT&T Intellectual Property I, L.P., Atlanta, GA (US)

(72) Inventor: Andy Y. Huang, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 382 days.

(21) Appl. No.: 14/506,127

(22) Filed: Oct. 3, 2014

(65) Prior Publication Data
US 2016/0099896 A1 Apr. 7, 2016

(51) Int. Cl.
G06F 15/16 (2006.01)
H04L 12/58 (2006.01)
H04L 29/08 (2006.01)
H04L 29/06 (2006.01)

(52) U.S. Cl.
CPC ............ H04L 51/08 (2013.01); H04L 63/083 (2013.01); H04L 67/06 (2013.01); H04L 67/1097 (2013.01)

(58) Field of Classification Search
CPC ..... H04L 12/584; H04L 51/08; H04L 41/026; H04L 12/58; H04L 65/1079
USPC ................. 709/206, 200, 217, 203
See application file for complete search history.

(56) References Cited

U.S. PATENT DOCUMENTS

| 6,505,236 | B1 | 1/2003 | Pollack |
| 7,054,905 | B1* | 5/2006 | Hanna ............... G06Q 10/107 709/206 |
| 7,257,639 | B1 | 8/2007 | Li et al. |
| 7,420,702 | B1 | 9/2008 | Buschi et al. |
| 7,480,067 | B2 | 1/2009 | Buschi et al. |
| 8,612,439 | B2 | 12/2013 | Prahlad et al. |
| 2010/0082713 | A1 | 4/2010 | Frid-Nielsen et al. |
| 2011/0153868 | A1 | 6/2011 | Castleberry et al. |
| 2012/0204250 | A1* | 8/2012 | Anderson ............ G06Q 10/107 726/9 |
| 2012/0259927 | A1 | 10/2012 | Lockhart |
| 2013/0173727 | A1 | 7/2013 | Libin et al. |
| 2013/0346537 | A1 | 12/2013 | Fitzpatrick et al. |

(Continued)

FOREIGN PATENT DOCUMENTS

EP 2629199 A1 8/2013

OTHER PUBLICATIONS

"Take SpiderOak Anywhere," retrieved from the Internet on Aug. 18, 2014, https://spideroak.com/mobile, 4 pgs.

(Continued)

Primary Examiner — El Hadji Sall
(74) Attorney, Agent, or Firm — Chiesa Shahinian & Giantomasi PC

(57) ABSTRACT

An electronic mail message sent from a sender device is received by an email server. The electronic mail message includes an attachment holder block including an authentication token and an address of an attachment stored at a remote server. The authentication token is transmitted to the remote server to login to the remote server to access the attachment. The attachment is retrieved from the remote server using the address of the attachment. The attachment is attached to the electronic mail message by replacing the attachment holder block with the attachment. The electronic mail message including the attachment is transmitted to a recipient.

17 Claims, 10 Drawing Sheets

(56) References Cited

U.S. PATENT DOCUMENTS

| | | |
|---|---|---|
| 2014/0006540 A1 | 1/2014 | Rao et al. |
| 2014/0019526 A1 | 1/2014 | Zeng et al. |
| 2014/0081984 A1 | 3/2014 | Sitsky et al. |
| 2014/0129650 A1 | 5/2014 | Coatta et al. |
| 2014/0164535 A1 | 6/2014 | Lynch et al. |
| 2014/0201848 A1 | 7/2014 | Kulkarni et al. |
| 2014/0214984 A1 | 7/2014 | Lee |
| 2014/0229550 A1 | 8/2014 | Tredoux et al. |
| 2015/0304220 A1* | 10/2015 | Miyao ............... H04L 67/1031 370/230 |

OTHER PUBLICATIONS

"OneDrive," Microsoft, retrieved from the Internet on Aug. 18, 2014, https://onedrive.live.com/about/en-us/, 10 pgs.

Henrikson, Kevin, "Dropbox Acompli," retrieved from the Internet on Aug. 15, 2014, https://www.dropbox.com/developers/blog/103/acompli-improves-mobile-email-app-experience-with-dropbox-document-preview-api, 2 pgs.

"MOVEit," retrieved from the Internet on Aug. 18, 2014, http://www.ipswitchft.com/moveit-managed-file-transfer/whats-new, 4 pgs.

Cassavoy, Liane, "Five free Dropbox tools you're not using (but should be)," Utility Software, www.pcworld.com, Aug. 29, 2013; http://www.pcworld.com/article/2046475/five-free-dropbox-tools-youre-notusing-but-should-be-.html, 11 pgs.

* cited by examiner

SYSTEM AND METHOD FOR ATTACHING A REMOTELY STORED ATTACHMENT TO AN EMAIL

FIELD

The present disclosure relates generally to a system and method for attaching a remotely stored attachment in an email and more particularly to a system and method for attaching a remotely stored attachment in an email by replacing an attachment holder block in the email with the remotely stored attachment.

BACKGROUND

Mobile device users are limited with respect to sending emails with attachments. In order to send an attachment with an email, the mobile device user can download an attachment locally or synchronize with a server that stores the attachment and then download the attachment prior to sending the email. This solution may bog down the limited storage on the user's mobile device. Also, if the user is in a limited bandwidth area or is unable to download large amounts of data, this solution would not work. Alternatively, the user can send a link to the attachment to a recipient so that the recipient can view the attachment. However, the email sent by the user would not contain the actual attachment and can only be accessed upon the recipient clicking on the link or accessing the link after logging in to a service providing the attachment. None of these options allow the mobile device user to efficiently attach remotely stored attachments in an email.

BRIEF SUMMARY

The present application provides a method, system and computer readable medium for attaching a remotely stored attachment to an electronic mail. An electronic mail message sent from a sender device is received. The electronic mail message includes an attachment holder block including an authentication token and an address of an attachment stored at a remote server. The authentication token is transmitted to the remote server to login to the remote server to access the attachment. The attachment is retrieved from the remote server using the address of the attachment. The attachment is attached to the electronic mail message by replacing the attachment holder block with the attachment. The electronic mail message including the attachment is transmitted to a recipient.

In accordance with an embodiment, a payload of the electronic mail message is parsed to locate a second attachment holder block. The second attachment holder block includes a second authentication token and an address of a second attachment stored at a second remote server. The second authentication token is transmitted to the second remote server to login to the second remote server. In response to determining that the login is unsuccessful, the second attachment holder block is replaced with error information indicating that the login is unsuccessful. The electronic mail message including the error information back to the sender device.

In accordance with an embodiment, a list of remote servers including multiple remote servers storing attachments is maintained. A payload of the electronic mail message is parsed to locate the attachment holder block. The payload includes multiple attachment holder blocks, where each of the attachment holder blocks is associated with one of the multiple remote servers storing attachments. The attachment holder block is analyzed to locate a respective authentication token associated with a respective remote server and a list of addresses of attachments stored at a respective remote server.

In accordance with an embodiment, the authentication token is obtained by the sender device after a successful login to the remote server.

In accordance with an embodiment, the attachment is encoded prior to the replacing the attachment holder block with the attachment.

In accordance with an embodiment, the replacing the attachment holder block with the attachment includes replacing a first portion of the attachment holder block with the attachment. It is determined that the attachment holder block further includes an address of a second attachment. It is determined that the second attachment is stored at the remote server. The second attachment is retrieved from the remote server using the address of the second attachment and the authentication token. The second attachment is attached to the electronic mail message by replacing a second portion of the attachment holder block with the second attachment. The transmission of the electronic mail message further includes transmitting the electronic message including the second attachment to the recipient.

In accordance with an embodiment, a list of remote servers including multiple remote servers storing attachments is maintained. A new remote server is added to the list of remote servers. An updated list of remote servers including the new remote server is provided to the sender device.

These and other advantages of the invention will be apparent to those of ordinary skill in the art by reference to the following detailed description and the accompanying drawings.

DETAILED DESCRIPTION

Figure 1:
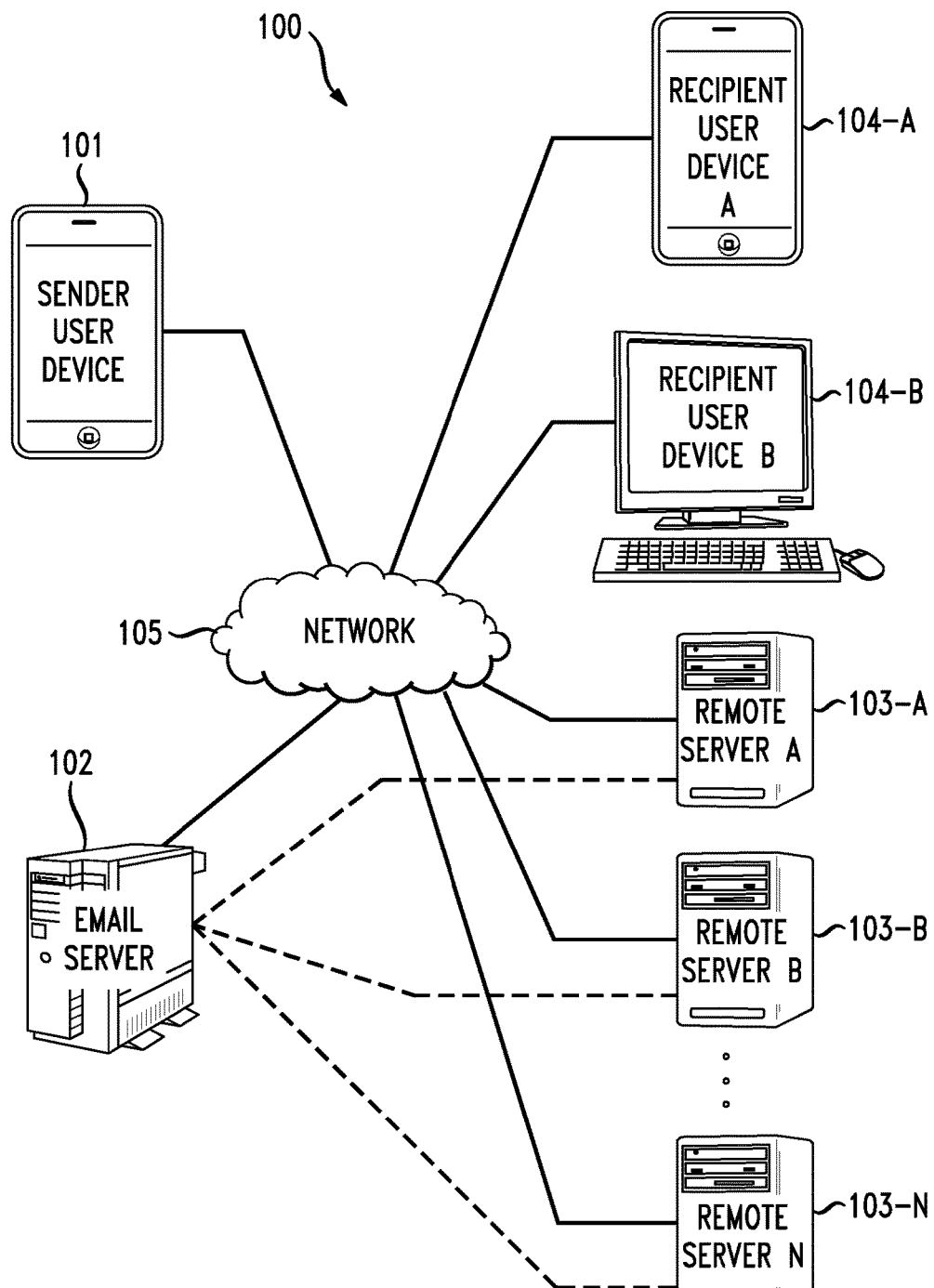
FIG. 1 depicts a system used to attach and send remotely stored email attachments, in accordance with an embodiment.

FIG. 1 depicts a system used to attach and send remotely stored email attachments, in accordance with an embodiment. System 100 includes a sender user device 101, an email server 102, a remote server A (103-A), a remote server B (103-B), . . . , a remote server N (103-N), a recipient user device A (104-A), a recipient user device B (104-B), and a network 105. System 100 may include additional sender user devices and recipient user devices in addition to those depicted in FIG. 1.

In the exemplary embodiment of FIG. 1, network 105 is the Internet. In other embodiments, network 105 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Sender user device 101 may be connected to network 105 through a direct (wired) link, or wirelessly. Sender user device 101 may have a display screen for displaying information. For example, sender user device 101 may be a personal computer, a laptop computer, a workstation, a mainframe computer, a mobile communication device such as a wireless phone, a personal digital assistant, cellular device, a laptop computer, a netbook, a tablet device, a wearable device, etc. Other devices may be used.

Each of remote servers A, B, . . . , N in FIG. 1 may be connected to network 105 through a directed (wired) link, or wirelessly. Each of remote servers A, B, . . . , N may be accessible, via network 105, using a respective website, where each respective remote server may host the respective website. Sender user device 101 may access a World Wide Web page on a website associated with a remote server that may be viewed using a conventional Web browser, for example. A user employing sender user device 101 may view, download or upload attachments on and/or from a remote server using the website, via network 105. The remote server provides the user with remote storage of files.

In an optional embodiment, each remote server may be connected to email server 102 through a physical wired connection. The physical wired connection is shown by dashed lines in FIG. 1. The connection may be a two-way connection. In such an embodiment, the direct connection provides for faster communication between the email server and the remote servers.

Figure 2:
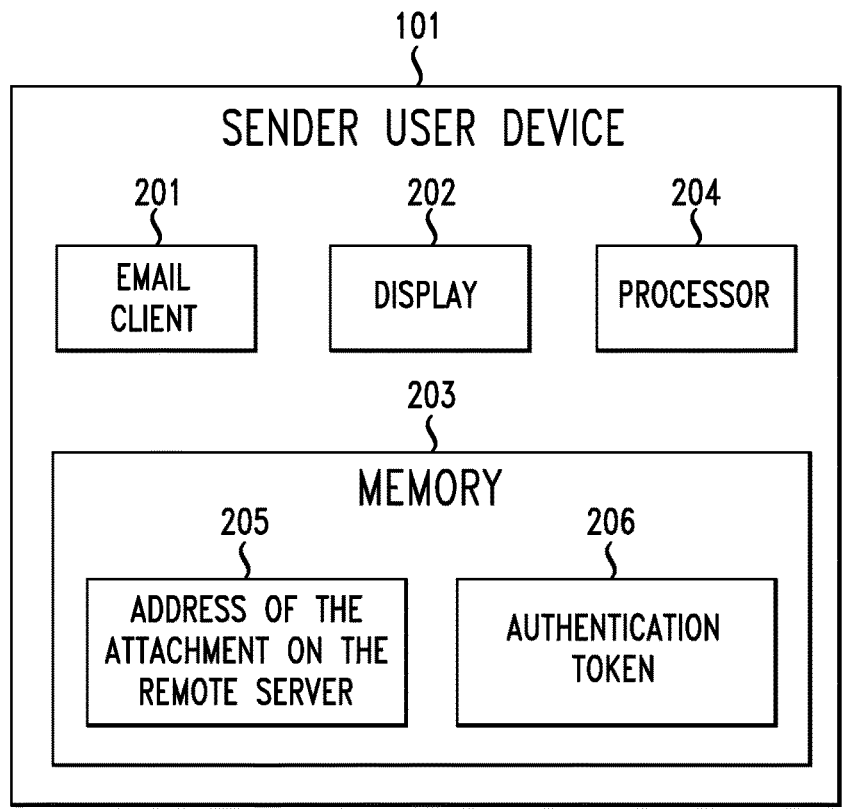
FIG. 2 depicts functional components of an exemplary sender user device, in accordance with an embodiment.

FIG. 2 depicts functional components of an exemplary sender user device, in accordance with an embodiment. Sender user device 101 includes an email client 201, a display 202, a memory 203, and a processor 204. Email client 201 allows a user to send, view, draft, forward, and receive emails. Email client 201 may provide webmail features to the user. Email client 201 may be accessed or downloaded by sender user device 101 for purposes of sending, viewing, drafting, forwarding, and receiving emails. In an embodiment, email client 201 may be associated with or hosted by email server 102. In the depicted embodiment, sender user device 101 may be a mobile device. The mobile device accesses webmail by connecting with email server 102, via network 105, in order to access emails. Email server 102 may store the emails.

Display 202 provides display of emails, documents, text, images, videos, webpages, and other information.

Memory 203 stores data including an address, such as a Uniform Resource Locator (URL), of an attachment on a remote server 205 (e.g., a remote server that stores a remotely saved attachment), and an authentication token 206 used to connect with the remote server. The authentication token is obtained from the remote server after a successful login to the remote server. The remote server transmits the authentication token to the sender user device so that the sender user device can use the authentication token to securely communicate with the remote server. Additional addresses and authentication tokens may be stored in memory 203.

Figure 3:
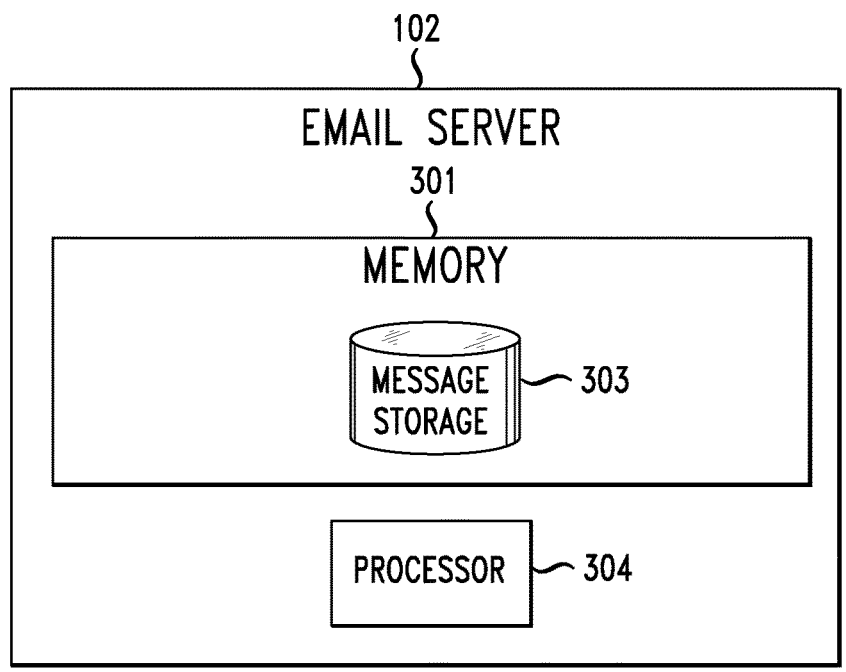
FIG. 3 depicts functional components of an exemplary email server, in accordance with an embodiment.

FIG. 3 depicts functional components of an exemplary email server, in accordance with an embodiment. Email server 102 includes a memory 301 and a processor 304. Memory 301 includes a message storage 303. Message storage 303 may be organized as a database. In an embodiment, all messages associated with a user employing sender user device 101 and having a user account associated with email server 102 may be stored within a message storage 303 database. When the user wishes to access an email on sender user device 101, the email is provided by email server 102 for display to the user. The emails may be transmitted to sender user device 101 using any of a number of protocols. Email server 102 may store messages and attachments for multiple user accounts.

Figure 4:
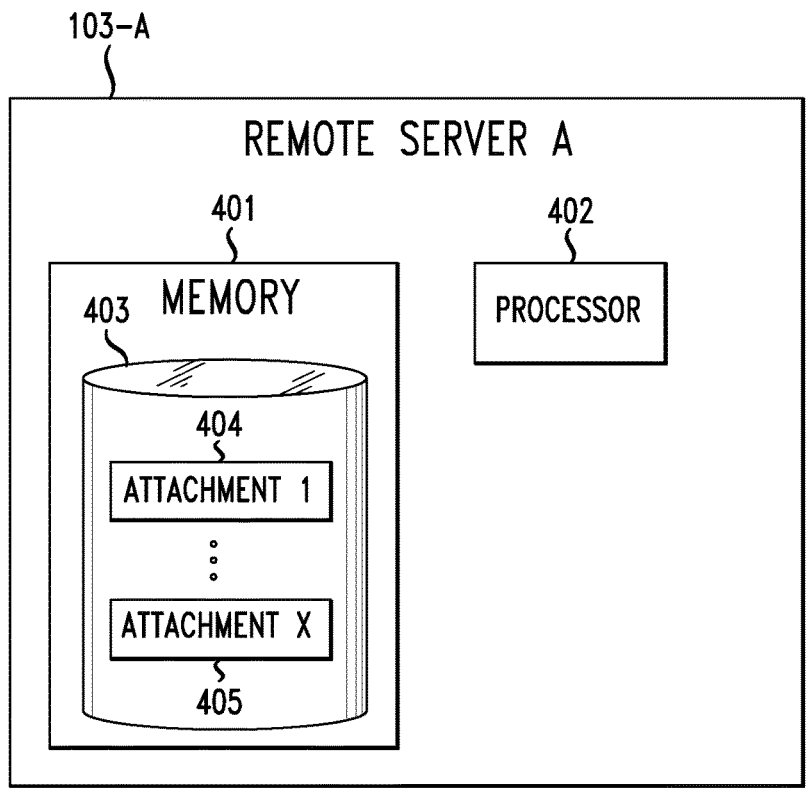
FIG. 4 depicts functional components of a first exemplary remote server, in accordance with an embodiment.

FIG. 4 depicts functional components of a first exemplary remote server, in accordance with an embodiment. A first remote server, remote server A (103-A) includes a memory 401 and a processor 402. Memory 401 includes an attachment database 403. Attachment database 403 may store multiple attachments including attachment 1 (404), . . . , attachment X (405). Different users may store large files such as text files, audio files, video files, image files, etc., on remote server A (103-A). For example, suppose that the user employing sender user device 101 has limited storage capability on his mobile device. In order to save and access large files remotely, the user may subscribe to storage services offered by a remote server. The user may login to the remote server, via network 105, and access the remote server using a website. The website may provide the user access to his/her saved files and the user may access the files remotely at any time using any device. The user can upload files onto the remote server and access the files remotely. The user may also share access to his/her files by providing other users with a URL link to the files stored on the remote server. In an embodiment, the user may utilize one or multiple remote servers including remote server A (103-A), remote server B (103-B), . . . , remote server N (103-N), etc. in order to store multiple files. In an embodiment, remote server A (103-A), remote server B (103-B), . . . , remote server N (103-N), may be cloud servers.

Figure 5:
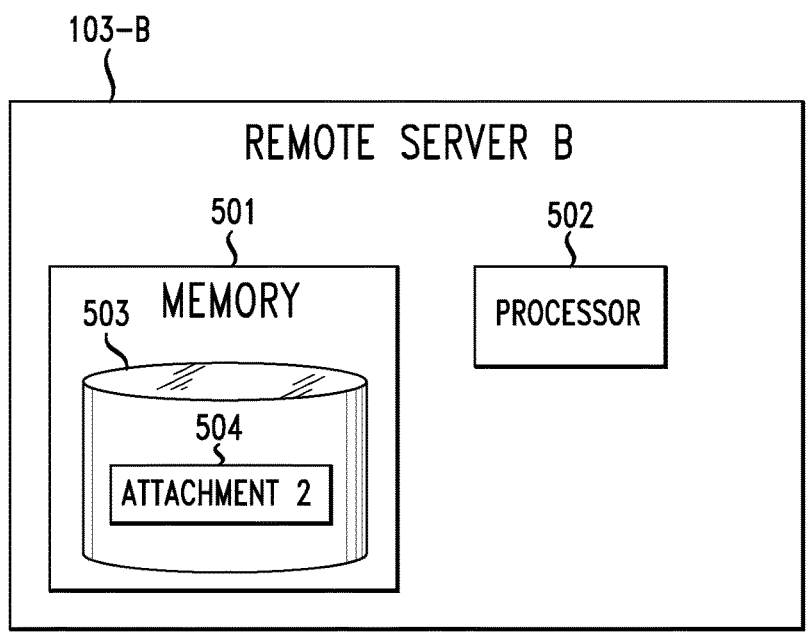
FIG. 5 depicts functional components of a second exemplary remote server, in accordance with an embodiment.

FIG. 5 depicts functional components of a second exemplary remote server, in accordance with an embodiment. A second remote server, remote server B (103-B) includes a memory 501 and a processor 502. Memory 501 includes an attachment database 503. Attachment database 503 may store multiple attachments. In the depicted embodiment, attachment database 503 stores attachment 2 (504). Additional attachments (not shown) may be stored. Additional remote servers may be accessible by a user. The figures depict up to "N" remote servers.

Figure 6:
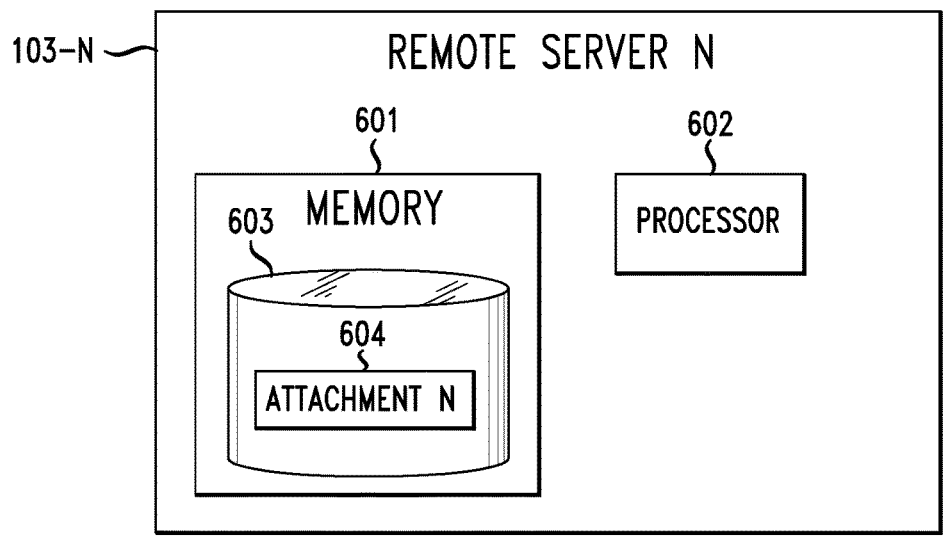
FIG. 6 depicts functional components of an N exemplary remote server, in accordance with an embodiment.

FIG. 6 depicts functional components of an N exemplary remote server, in accordance with an embodiment. Remote server N (103-N) includes a memory 601 and a processor 602. Memory 601 includes an attachment database 603. Attachment database 603 may store multiple attachments. In the depicted embodiment, attachment database 603 stores attachment N (604). Additional attachments (not shown) may be stored.

Figure 7:
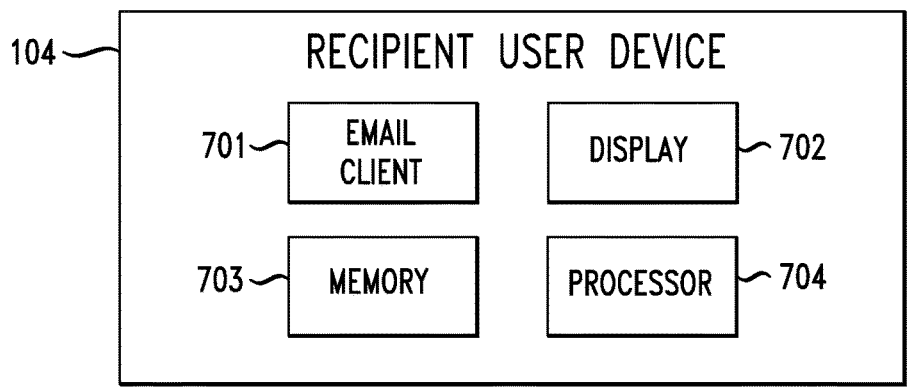
FIG. 7 depicts functional components of an exemplary recipient user device, in accordance with an embodiment.

FIG. 7 depicts functional components of an exemplary recipient user device, in accordance with an embodiment. Components of user device 104 in FIG. 7 are the same components included in recipient user device 104-A and recipient user device 104-B shown in FIG. 1. Recipient user device 104 includes an email client 701, a display 702, a memory 703, and a processor 704. A user employing recipient user device 104 may receive an email message including an attachment. The user may access the email using email client 701, via network 105. Email client 701 may be associated with an email server that pushes the email to the recipient user device. The user may view the email on his/her device using display 702.

Figure 8:
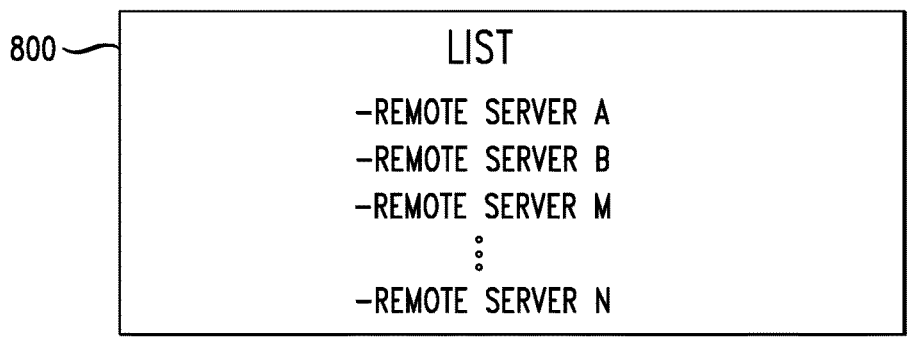
FIG. 8 depicts a list of remote servers, in accordance with an embodiment.

FIG. 8 depicts a list 800 of remote servers. List 800 is maintained by email server 102. Email server 102 may maintain the list of remote servers capable of communicating with email server 102. The list may include remote servers storing attachments, which may be connected with email server 102 via physical wired connections, as shown by dashed lines in FIG. 1. The list is actively maintained so that when a new remote server is capable of connecting with email server 102 and facilitates attachments of stored attachments into an email via the email server, the new remote server is appended to the list and the list is updated. For example, when a new remote server, remote server M, is capable of connecting with email server 102, remote server M is added to list 800. An updated list of remote servers including the new remote server is provided to the sender device by the email server. A remote server that no longer connects with email server 102 can be removed from the list. Therefore, the email server maintains an up-to-date list by adding or removing remote servers when needed. The email server may provide the list of remote servers to the sender device when the sender device logs in to the email server. The email server may provide an updated list to the sender device when a change in the list occurs. In another embodiment, the email server may transmit the updated list to the sender device periodically. For example, the email server may send an updated list (if available) to the sender device every few hours, every few days, etc. The user employing sender user device 101 can use the list of remote servers so that he/she can choose which remote server to store files to and/or otherwise access files from. The list may be sorted alphabetically, chronologically based on when remote servers are added to the list, etc.

Figure 9A:
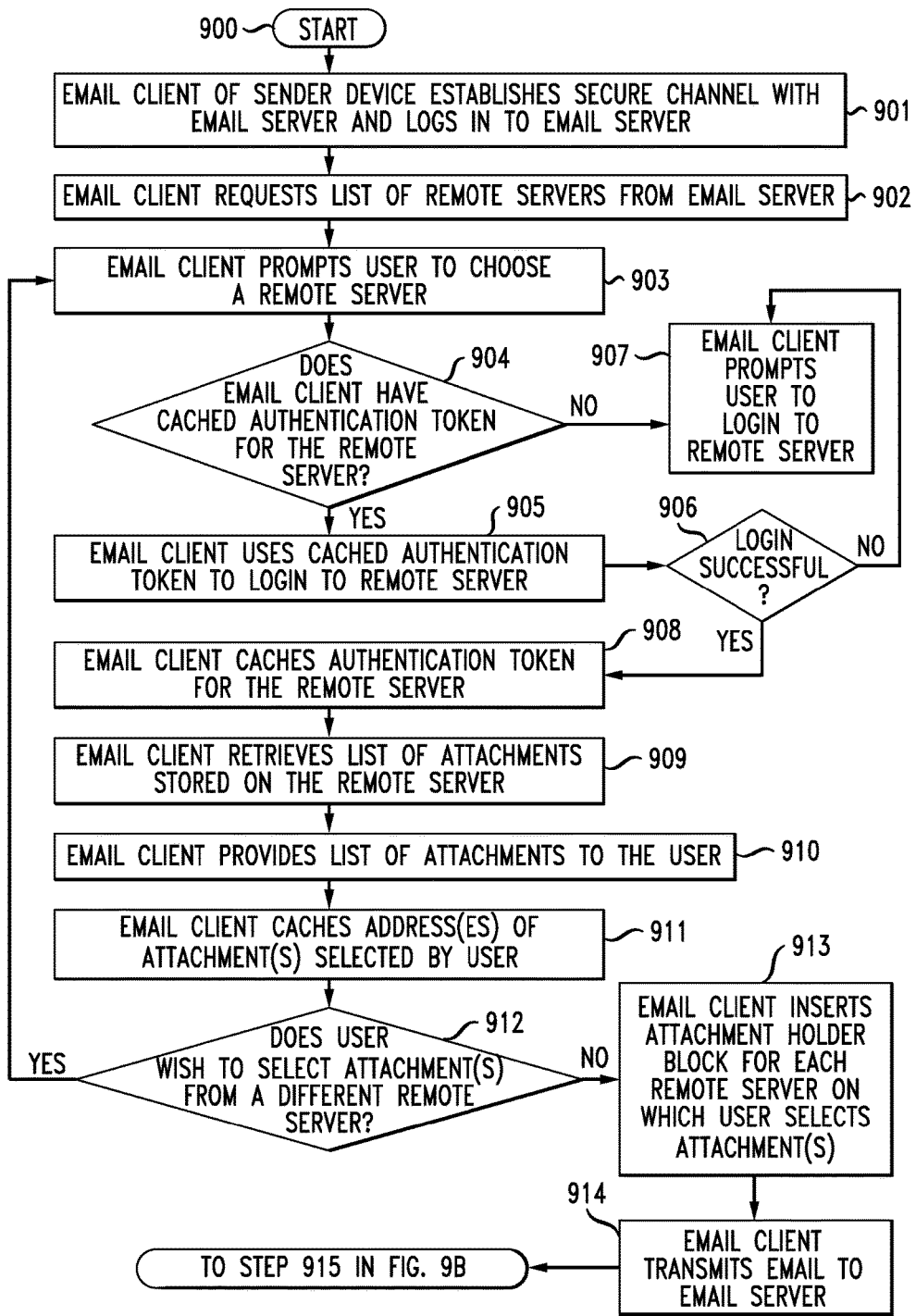
FIG. 9A is a flowchart of a method of attaching a remotely stored attachment in an email from an email client perspective, in accordance with an embodiment.
Figure 9B:
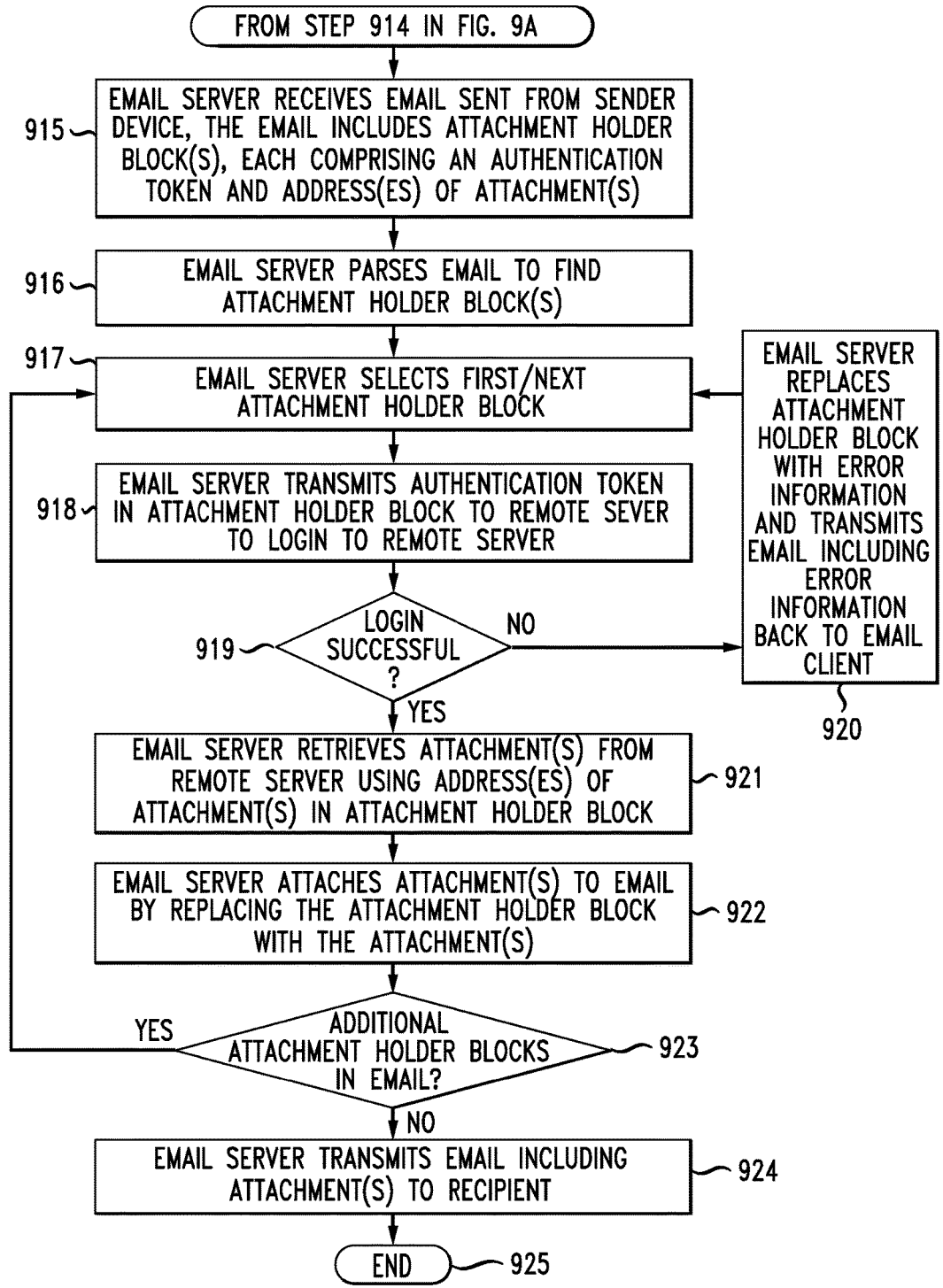
FIG. 9B is a flowchart of a method of attaching a remotely stored attachment in an email from an email server perspective, in accordance with an embodiment.

FIG. 9A and FIG. 9B describe how a user can send an email with a remotely stored attachment to a recipient. Specifically, FIG. 9A is a flowchart of a method of attaching a remotely stored attachment in an email from an email client perspective, in accordance with an embodiment. FIG. 9B is a flowchart of a method of attaching a remotely stored attachment in an email from an email server perspective, in accordance with an embodiment. The method begins at step 900. At step 901, an email client of a sender device establishes a secure channel with an email server and logs in to the email server. Email client 201 of sender user device 101 establishes a secure channel with email server 102. The secure channel may be a channel that connects sender user device 101 with email server 102, via network 105. Email client 201 logs in to email server 102 using the secure channel. A user login name and login password may be required in order to login to email server 102. Other methods of secure login may be used. In an embodiment, the secure channel is implemented using SSL (Secure Sockets Layer) or Transport Layer Security (TLS).

At step 902, the email client requests a list of remote servers from the email server. Email client 201 requests a list 800 of remote servers from email server 102. As described above, the list provides remote servers capable of communicating with email server 102. Email client 201 may request the list 800 upon logging in to email server 102. Based on this list, email client 201 can present the user with the various remote servers capable of storing remote attachments that can be accessed by the user.

At step 903, the email client prompts the user to choose a remote server. Email client 201 prompts the user employing sender user device 101 to choose a remote server from the list 800 of remote servers.

At step 904, it is determined whether the email client has a cached authentication token for the remote server. Email client 201 determines whether a cached authentication token is stored for remote server A. In another embodiment, the remote server chosen by the user in step 903 may determine whether email client 201 has a cached authentication token for the remote server. The authentication token may have been cached from an earlier login session between the email client and the remote server. Sender user device 101 and email client 201 may include email client software that can use a cached authentication token for authentication if an authentication token is already present/available. In response to determining that email client 201 has a cached authentication token for the remote server, the process continues to step 905. At step 905, the email client uses the cached authentication token to login to the remote server. Email client 201 uses the cached authentication token to login to the remote server that is chosen in step 903. Details regarding the login are described herein with respect to step 907.

At step 906, it is determined whether the login is successful. Email client 201 determines whether the login to the remote server is successful, and if it is, the process continues to step 908. If the login is not successful, the process continues to step 907. Details regarding step 907 are described herein.

In response to determining that email client 201 does not have a cached authentication token for the remote server, at step 904, the process continues to step 907. Also, if the login is not successful in response to step 906, the process continues to step 907. At step 907, the email client prompts the user to login to a remote server. Email client 201 prompts the user employing sender user device 101 to login to remote server A (103-A) so that the user can select which attachment(s) to select.

In an embodiment, a known authentication scheme such as open authentication (OAuth) may be used for the email client to login to remote server A (103-A). Once authentication is successful, the user is able to select the attachment(s).

After step 907, the process continues to step 906 where it is determined whether the login was successful. Email client 201 determines whether the login to the remote server is successful, and if it is, the process continues to step 908. If the login is not successful, the process continues to step 907.

At step 908, the email client caches the authentication token for the remote server. Email client 201 caches authentication token 206, as shown in FIG. 2, for remote server A. Email client 201 may cache authentication token 206 into memory 203. In an embodiment, when the email client successfully logs the user in to remote server A, the email client may remain logged in to remote server A for a period of time (e.g., a week). The authentication token may remain active for the period of time and the user may not need to relogin during the period of time because the authentication token remains cached on sender user device 101. Other authentication schemes may be used.

At step 909, the email client retrieves a list of attachments stored on the remote server. Email client 201 retrieves a list of attachments that are stored on remote server A. Remote server A includes attachments 1, . . . , attachment X.

At step 910, the email client provides the list of attachments to the user. Email client 201 provides the list of attachments that can be attached to the email to the user employing user device 101. The list may be in the form of a text list providing names of the attachments. In another embodiment, the list may be in graphical form, where icons of the multimedia attachments are displayed to the user. In another embodiment, the list may be a mix of graphics and/or text. The user selects one or more attachments from the list of attachments stored on server A to attach to the email.

Figure 10:
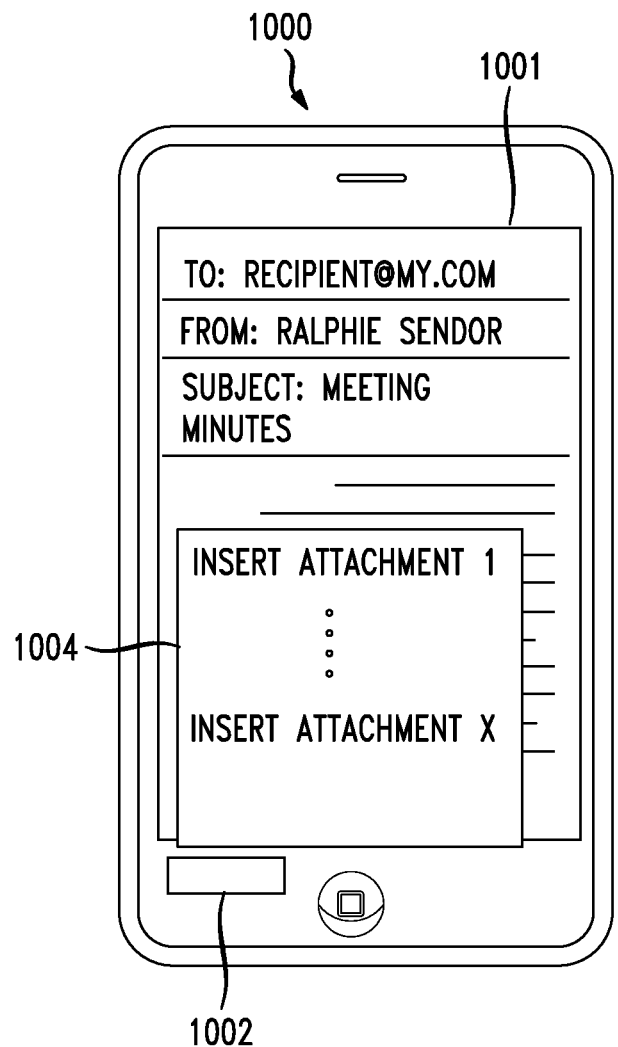
FIG. 10 depicts a user device display providing an exemplary graphical user interface providing a list of available attachments for attaching in an email, in accordance with an embodiment.

The user may be provided with a graphical user interface which can be used to select attachment(s) to attach in the email, as shown in FIG. 10. Specifically, FIG. 10 depicts a user device display providing an exemplary graphical user interface providing a list of available attachments for attaching in an email, in accordance with an embodiment. A user device display 1000 provides a graphical user interface 1001 showing an email being composed. The email may include a location to input the sender's name, the recipient's name, the subject, the text of the email, etc. Upon depressing button 1002 on the user device, a list of attachments 1004 is displayed to the user. Button 1002 may be a soft button, a hard button, or a button that is invisible but appears when a user's finger hovers over a portion of the area covered by the button.

Suppose that the user selects to insert attachment 1 to be included in the email. The user may touch a portion of an area on the device to select the insertion of attachment 1. Other forms of selection, including voice commands, etc. may be used.

At step 911, the email client caches the address(es) of the attachment(s) selected by the user. Email client 201 caches the address of attachment 1 selected by the user employing user device 101. Email client 201 may cache the address of the attachment on the remote server 205 (i.e., where the attachment is stored) into memory 203. In one embodiment, the address may in the form of a URL that may be hidden, temporary, or protected such that unauthorized users cannot access the attachment using the link. Suppose that the user selects attachment X as well as attachment 1 to attach to the email. Email client 201 would then cache the addresses of attachment 1 and attachment X selected by the user, in step 911.

At step 912, it is determined whether the user wishes to select attachment(s) from a different remote server. Email client 201 determines whether the user employing user device 101 wishes to select attachment(s) from a different remote server. Email client 201 may ask the user whether the user wishes to select additional attachment(s) by providing a graphical and/or textual display to the user to make an additional selection. Email client 201 may ask the user whether the user wishes to select additional attachment(s) by providing with a pop up window, inline window, or other alert allowing the user to indicate that he/she wishes to select additional attachments. If the user wishes to select additional attachments from a different remote server, the process returns to step 903. For example, if the user wishes to select additional attachments from remote server B, the process would return to step 903, where email client 201 would prompt the user to choose remote server B. When the user is provided a list of attachments stored on remote server B (at step 910), the list may be provided in a similar fashion as the list of attachments 1004 stored on remote server A, in FIG. 10. The user may select to attach attachment 2 (504) stored on remote server B (103-B), at step 910. Otherwise, if the user does not wish to select additional attachments from a different remote server, the process continues to step 913.

At step 913, the email client inserts an attachment holder block for each remote server on which the user selects attachment(s). Email client 201 inserts one or more attachment holder blocks. A single attachment holder block is remote server specific. In other words, a single attachment holder block includes an authentication token for a remote server and one or more addresses of attachments that stored on that remote server, where the attachments are selected by the user.

Figure 11:
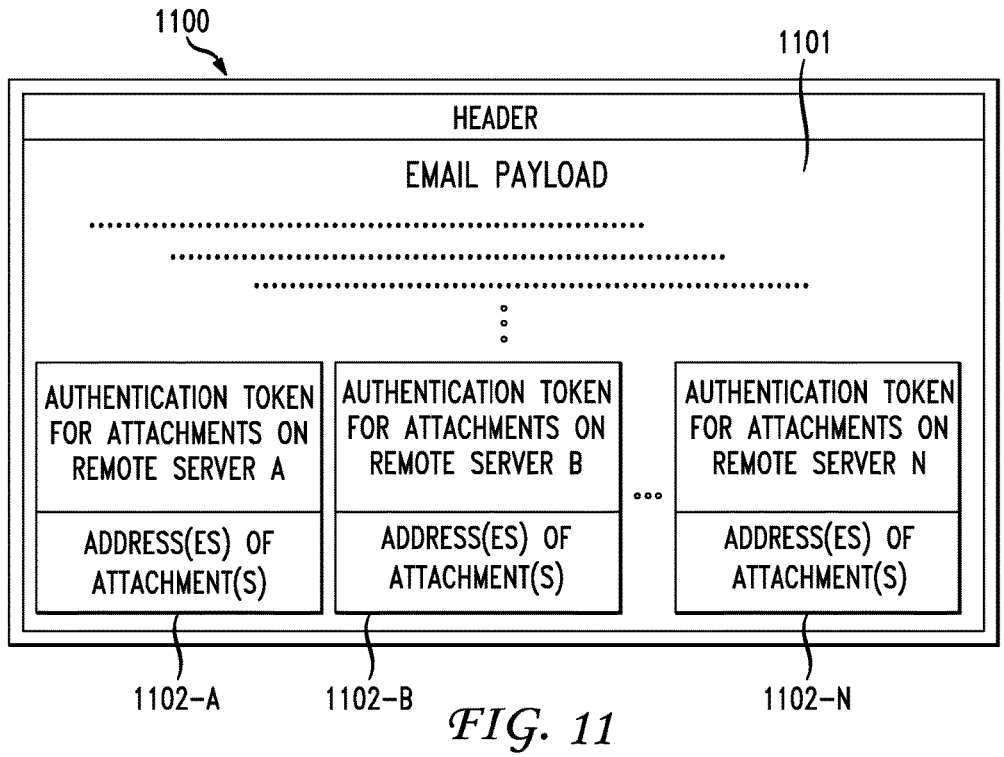
FIG. 11 depicts an exemplary email including attachment holder blocks, in accordance with an embodiment.

In FIG. 11, an email 1100 including attachment holder blocks is depicted, in accordance with an embodiment. An email payload 1101 is created in a way that each attachment holder blocks holds the place of an attachment to be attached by the email server. The email may include additional information such as a header, etc. Email payload 1101 includes attachment holder blocks 1102-A, 1102-B, . . . , 1102-N which are inserted by email client 201. Suppose that the user wishes to attach multiple remotely stored attachments into the email. When the email is transmitted by email client 201, via network 105, to email server 102, email client 201 places the attachment holder blocks into email payload 1101. In FIG. 11, the email may include attachment holder block 1102-A for one or more attachments that are stored on remote server A. For example, the attachment holder block may hold a place for attachment 1 and attachment X, both of which are stored on remote server A. For both attachment 1 and attachment X, attachment holder block 1102-A includes an authentication token for the attachments stored on remote server A and respective addresses (i.e., URLs) of the location where attachment 1 and attachment X are stored. The addresses of the location of the attachments and the authentication token blocks are inserted into the email payload by sender user device 101 which caches the addresses and the authentication tokens.

Additionally, if the user has selected to attach attachment 2 into the email, email client 201 would insert attachment holder block 1102-B to be included in the payload of the email. Attachment holder block 1102-B includes an authentication token for one or more attachments on remote server B as well as the address(es) of the attachment(s). For each attachment (or set of attachments) that are stored on a remote server that the user wishes to attach in the email, a separate attachment holder block is included in the email's payload. In the depicted embodiment, up to "N" attachments may be selected for attaching into the email. Attachment holder block 1102-N includes an authentication token for attachment(s) on remote server N and the address(es) of the attachment(s).

At step 914, the email client transmits the email to the email server. Email client 201 transmits the email to email server 102, via network 105. The transmission is through the secure channel. The email may be transmitted upon a user selection of a send email command, for example. The transmitted email includes an attachment holder block for each attachment that the user wishes to attach to the email. Specifically, a payload of the email contains the attachment holder block(s). The process then continues to step 915 in FIG. 9B.

At step 915, the email server receives the email sent from the sender device, where the email includes attachment holder block(s), each comprising an authentication token and an address(es) of the attachment(s). Email server 102 receives the email from sender user device 101, via network 105 (using a secure channel), where the email includes an attachment holder block, where each attachment holder block includes an authentication token and address(es) of the attachment(s). Referring again to FIG. 11, email server 102 would receive an email including email payload 1101 that includes attachment holder blocks for each attachment (or each set of attachments, provided as a list, that are stored on a single remote server). Each attachment holder block takes the place of a locally attached attachment which is typically indicated by encoded bytes. In other words, a typical email that is received by the email server which contains attachments locally saved by the sender user device represents the attachments as encoded bytes. However, since the attachments are remotely stored, the attachment holder block(s) is/are used to hold the place of the attachment(s) which will be later inserted into the email's payload by the email server. In an embodiment, the email may contain a mix of locally stored attachments and remotely stored attachments. For example, if the email contains a locally stored attachment and an indication to insert a remotely stored attachment, then the email payload would include the attachment as encoded bytes and the remotely stored attachment that is to be attached will be indicated by an attachment holder block.

At step 916, the email server parses the email to find attachment holder block(s). Email server 102 parses the email, specifically the email payload, to find attachment holder block(s). Email server 102, after receiving the email payload from sender user device 101, parses the email payload to find one or more attachment holder blocks. Once the attachment block, including the address of the attachment and the authentication token, is found, email server 102 determines that the attachment is stored at remote server A (103-A) based on the address of the attachment. The address may be in the form of a URL. Suppose that the email payload includes attachment holder block 1102-A. Email server 102 would parse the email payload to find attachment holder block 1102-A and find the address of the attachment (or addresses of multiple respective attachments) along with the authentication token. The address is a URL linking to remote server A. Email server 102 may perform the parsing for each additional attachment block included in the email payload.

When the email server parses and analyzes the payload of the email to locate attachment holder blocks, the email server is able to determine which remote server is associated with each of the attachment holder blocks based on the address of the attachment. The payload may include a plurality of attachment holder blocks, where each of the plurality of attachment holder blocks is associated with one of the plurality of remote servers that store attachments. As the email server maintains a list of all the remote servers capable of connecting with the email server, the email server is able to connect with the appropriate remote server based on the list. A single attachment holder block may include multiple addresses of multiple attachments stored on the corresponding server. The multiple addresses may be provided as a list that groups attachments in an order that the user chose to insert the attachments. The email server parses each attachment holder block to find a respective authentication token that is associated with a respective remote server and a list of addresses of attachments that are stored at the respective remote server.

At step 917, the email server selects the first and/or next attachment holder block. Email server 102 selects a first attachment holder block found as a result of parsing.

At step 918, the email server transmits the authentication token in the attachment holder block to the remote server to login to the remote server. Email server 102 transmits the authentication token in the attachment holder block to remote server A (103-A) to login to remote server A. Email server 102 logins to remote server A (103-A) using the authentication token in the attachment holder block to obtain authorization from remote server A to access attachment 1.

At step 919, it is determined whether the login is successful. Email server 102 determines whether a login to remote server A is successful. If the login is not successful, at step 920, the email server replaces the attachment holder block with error information and transmits the email including error information back to the email client. In an embodiment, if the email server is unable to retrieve the attachment (e.g., if the attachment no longer exists at the URL, if there is a connection error causing a problem in providing the attachment, if the user account associated with the remote server is modified, deleted, has a changed password, etc., if the remote server is experiencing problems, if a change is made to the attachment stored on the remote server, etc.), the remote server may transmit error information along with the email to the user employing sender user device 101. The attachment holder block is replaced with the error information by email server 102, and email server 102 sends the email and the error information back to email client 201. The error information may indicate a reason why attaching of the attachment(s) failed. For example, the error information may indicate that there was a connection time-out error, attachment not found error, account on the remote server no longer exists error, account login incorrect error, etc. that will help the user determine why the downloading of the attachment failed. The error information can optionally be transmitted by email server 102 back to email client 201 indicating why the attaching of the attachment(s) failed. This way, the user may attempt to remedy the problem between the remote server and the email server by removing the cached authentication token or otherwise resend a revised email with an updated attachment or the delete the problematic attachment. The email server may also offer the user an option to remove the problematic attachment prior to sending the email to the recipient. In an embodiment, email server 102 may send the email back to client server 201 so that the email client can remove the cached authentication token which caused a problem. By doing so, this avoids the problem of the recipient receiving a blank placeholder attachment, an erroneous attachment, or other error messages. The process then returns to step 917, where email server 102 selects a next attachment holder block. If there is only a single attachment holder block (and there are no "next" attachment holder blocks in step 917), the process continues to step 919.

At step 919, if it is determined that the login is successful, the process continues to step 921. At step 921, the email server retrieves attachment(s) from the remote server using address(es) of the attachment(s) in the attachment holder block. Email server 102 retrieves attachment 1 from remote server A (103-A) using the address (e.g., URL) of attachment 1.

In response to the retrieving the attachment from the remote server, email server 102 may then download the attachment using the URL of the attachment.

At step 922, the email server attaches attachment(s) to the email by replacing the attachment holder block with the attachment(s). Email server 102 attaches attachment 1 to the email by replacing attachment holder block 1102-A in FIG. 11 with the attachment 1. Specifically, email server 102 modifies the payload of the email by removing the block and replacing the block with the stored attachment. The stored attachment is then inserted into the email payload. The attachment is placed into the email payload as encoded bytes, in the same way as a locally stored attachment at a sender device is encoded when attached to an email. In an embodiment, the attachment may be encoded prior to the replacing the attachment holder block with the attachment.

If the attachment holder block includes multiple addresses corresponding to multiple attachments stored on the same remote server, email server 102 replaces portions attachment holder block with each of the multiple attachments. Email server 102 may determine that the second attachment (attachment X) is stored at remote server A and transmit the authentication token to remote server A to obtain authorization from remote server A to access the second attachment (attachment X). Email server 102 may retrieve the second attachment (attachment X) from remote server A using the address of the second attachment and attach the second attachment to the electronic mail message by replacing a portion of the attachment holder block (1102-A) with the second attachment (attachment X).

Figure 12:
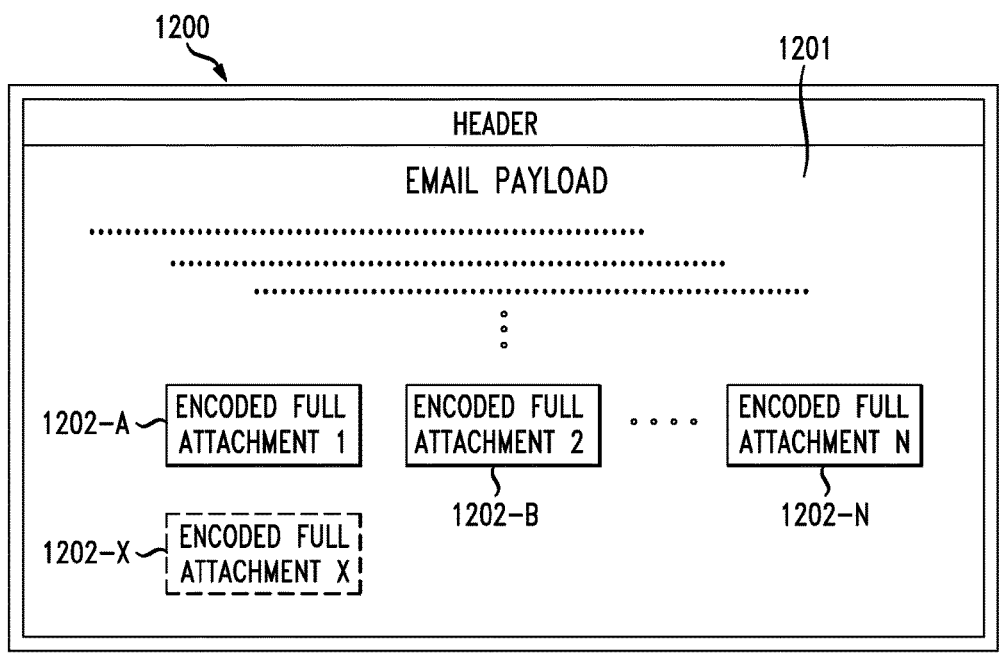
FIG. 12 depicts an exemplary email including attachments, in accordance with an embodiment.

Referring now to FIG. 12, which depicts an exemplary email including attachments, in accordance with an embodiment, an email 1200 includes a modified email payload 1201. The email may include additional information such as a header, etc. Modified email payload 1201 now includes encoded bytes representing attachments. For example, attachment holder block 1102-A shown in FIG. 11 is replaced with an encoded full attachment 1 (1202-A) in FIG. 12. Optionally, if attachment holder block 1102-A included attachment X as an additional attachment, then attachment holder block 1102-A would be replaced with both encoded full attachment 1 (1202-A) as well as encoded full attachment X (1202-X), which is shown by dashed box in FIG. 12.

Referring again to FIG. 9B, in step 923, it is determined whether additional holder blocks are included in the email. Email server 102 determines whether additional holder blocks are included in the email. If no additional holder blocks are included in the email, the process continues to step 924.

If however, additional holder blocks saved on additional remote servers are included in the email at step 923, the process returns to step 917. At step 917, email server 102 would select the next attachment holder block. If a second attachment holder blocks (or additional holder block(s)) are included in the email payload, then in step 916, email server 102 would parse the email payload to locate the second attachment holder block. The second attachment holder block (e.g., 1102-B) includes a second authentication token and an address of a second attachment (e.g., attachment 2) stored at a second remote server (e.g., remote server B). The second authentication token is transmitted to the second remote server to login to the second remote server, in step 918. In response to determining that the login is unsuccessful, in step 919, the second attachment holder block is replaced with error information indicating that the login is unsuccessful. The electronic mail message including the error information back to the sender device in step 920. The process then again returns to step 917.

Figure 13:
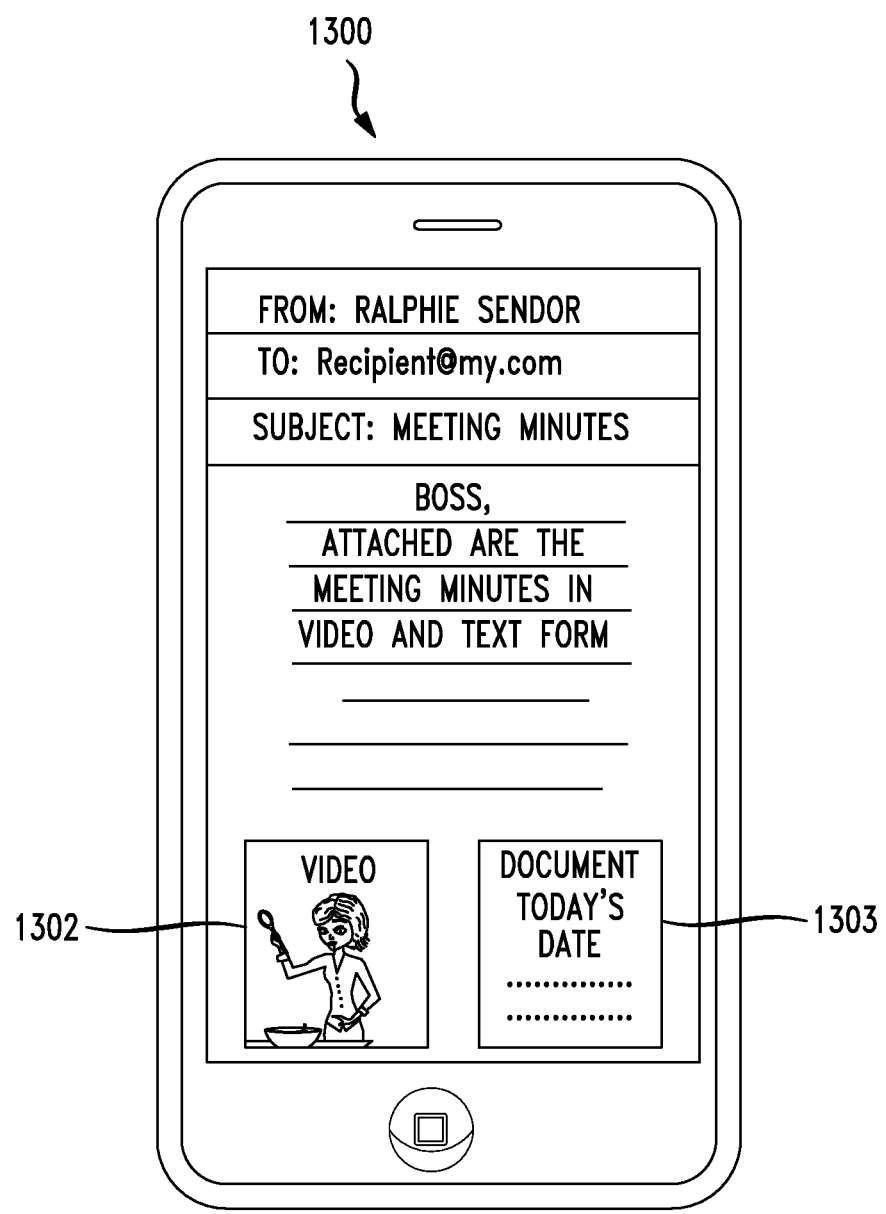
FIG. 13 depicts an exemplary graphical user interface of an email including attachments, in accordance with an embodiment.

At step 924, the email server transmits the email including attachment(s) to a recipient. Email server 102 transmits the email including attachment(s) to a recipient that is employing recipient user device A (104-A). As seen in FIG. 13 which depicts an exemplary graphical user interface of an email including attachments, in accordance with an embodiment, the recipient views a graphical user interface 1300. The email includes attachments for the recipient to view, access and/or download. In the depicted embodiment, an icon 1302 represents the attachment for a video and an icon 1303 represents the attachment for a document. The icons may depict text, images, graphics, etc. to identify each attachment. The recipient receives the email with the attachment as he/she would any other email that is sent having attachments that are locally stored by the sender user device. Therefore, the recipient is unaware that the attachments are not locally stored on the device of the sender.

In an embodiment, the email server may transmit the email to another (recipient) email server associated with the recipient. The other recipient email server would then forward the email to the recipient.

At step 925, the process ends.

In one embodiment, should the recipient wish to forward a copy of the email a second recipient employing recipient user device B (104-B), the recipient may do so without any further processing. The second recipient is unaware that the attachment was previously stored by a sender on a remote server. The attachment is provided to the second recipient the same way as any other locally stored attachment would be.

Suppose that a user named Ralphie Sendor employing sender user device 101 wishes to send an email to his boss while away from his office computer. Ralphie can login to a remote server to select attachments that he needs to send by email to his boss. Ralphie may have uploaded the attachments onto the remote server so that he can access them remotely. As Ralphie is unable store the attachments onto his mobile device by downloading them off the remote server because the attachments are too large to download and/or Ralphie's mobile device data transfer rate is too low, Ralphie uses the system of attaching remotely stored attachments into his email. In order for Ralphie to send the email along with the attachments to his boss, Ralphie can access the attachments which are stored remotely and attach them into an email that he is composing using his mobile device (sender user device 101). Ralphie would begin by opening an email application on his mobile device to draft the email. When opening the email application, email client 201 of sender user device 101 would login to email server 102, via network 105. Email client 201 would prompt Ralphie to login to the remote server in order select one or more remotely stored attachments. After logging in to the remote server, email client 201 would provide Ralphie with a list of attachments 1004 that are available for attaching in the email. Ralphie selects an attachment (e.g., a video) to attach to the email. Email client 201 may then ask Ralphie if he wishes to attach additional attachment(s) from additional remote servers. Ralphie may then select a word processing document stored on remote server B (103-B) to attach into the email as well, after email client 201 logs in to remote server B. Email client 201 caches the URL of the word processing document attachment and the associated authentication token obtained after successfully logging in to remote server B (103-B). If Ralphie does not wish to attach additional attachments into the email, email client 201 would transmit the email to email server 102 upon selection of a "send email" command. Email server 102 would then receive the email that has one or more attachment holder blocks included in the email payload. Email server 102 parses the email to find attachment holder blocks. Email server 102 then determines, based on the URL of the attachment included in the email payload, where the attachment is stored. For each attachment holder block selected by email server 102, email server 102 uses the authentication token to login to the respective remote server. For example, the video attachment may be stored on remote server A (103-A) and email server 102 logs in to remote server A to retrieve the video attachment. Email server 102 then modifies the email payload by removing the attachment holder block for the video attachment and replaces it with an encoded video attachment. Similarly, for the word processing attachment stored on remote server B (103-B), email server 102 logs into remote server B to retrieve the word processing attachment, modifies the email payload by removing the attachment holder block for the word processing attachment and replaces it with an encoded word processing attachment. Email server 102 then transmits the email with the attachments to the recipient, Raphlie's boss.

When Ralphie's boss receives the email, as shown in FIG. 13, his boss is unaware of the process of attaching the remotely stored attachments into the email. Ralphie's boss views the email with the attachments as he/she would view any other email that was sent with locally stored attachments that are stored on the device used to send the email. Ralphie's boss would not realize that Ralphie transmitted the email and attachments from a remote location away from his desk. The email would appear no different to Ralphie's boss than an email Ralphie would send from his work computer that has locally stored attachments.

Figure 14:
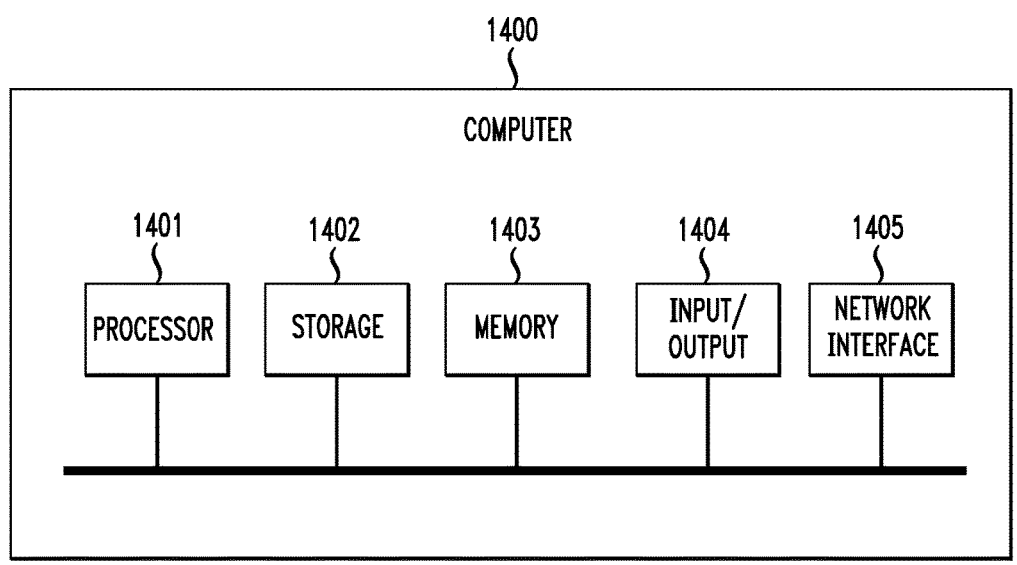
FIG. 14 illustratively depicts components of a computer that may be used to implement various embodiments.

A high-level block diagram of an exemplary computer that may be used to implement systems, apparatus and methods described herein is illustrated in FIG. 14. Computer 1400 includes a processor 1401 operatively coupled to a data storage device 1402 and a memory 1403. Processor 1401 controls the overall operation of computer 1400 by executing computer program instructions that define such operations. The computer program instructions may be stored in data storage device 1402, or other computer readable medium, and loaded into memory 1403 when execution of the computer program instructions is desired. Thus, the method steps of FIGS. 9A and 9B can be defined by the computer program instructions stored in memory 1403 and/or data storage device 1402 and controlled by the processor 1401 executing the computer program instructions. For example, the computer program instructions can be implemented as computer executable code programmed by one skilled in the art to perform an algorithm defined by the method steps of FIG. 9. Accordingly, by executing the computer program instructions, the processor 1401 executes an algorithm defined by the method steps of FIG. 9. Computer 1400 also includes one or more network interfaces 1404 for communicating with other devices via a network. Computer 1400 also includes one or more input/output devices 1405 that enable user interaction with computer 1400 (e.g., display, keyboard, mouse, speakers, buttons, etc.).

Processor 1401 may include both general and special purpose microprocessors, and may be the sole processor or one of multiple processors of computer 1400. Processor 1401 may include one or more central processing units (CPUs), for example. Processor 1401, data storage device 1402, and/or memory 1403 may include, be supplemented by, or incorporated in, one or more application-specific integrated circuits (ASICs) and/or one or more field programmable gate lists (FPGAs).

Data storage device 1402 and memory 1403 each include a tangible non-transitory computer readable storage medium. Data storage device 1402, and memory 1403, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1405 may include peripherals, such as a printer, scanner, display screen, etc. For example, input/output devices 1405 may include a display device such as a cathode ray tube (CRT) or liquid crystal display (LCD) monitor for displaying information to the user, a keyboard, and a pointing device such as a mouse or a trackball by which the user can provide input to computer 1400.

Any or all of the systems and apparatus discussed herein, including sender user device 101, email server 102, remote server A (103-A), remote server B (103-B), . . . , remote server N (103-N), recipient user device 104, recipient user device A (104-A), recipient user device B (104-B), email client 201, email client 701 and email client 801 may be implemented using a computer such as computer 1400.

One skilled in the art will recognize that an implementation of an actual computer or computer system may have other structures and may contain other components as well, and that FIG. 14 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of attaching a remotely stored attachment to an electronic mail message comprising:

receiving an electronic mail message from a sender device, the electronic mail message comprising an attachment holder block comprising an authentication token and an address of an attachment stored at a remote server;

transmitting the authentication token to the remote server to login to the remote server to access the attachment;

retrieving the attachment from the remote server using the address of the attachment;

attaching the attachment to the electronic mail message by replacing the attachment holder block with the attachment;

transmitting the electronic mail message including the attachment to a recipient;

parsing a payload of the electronic mail message to locate a second attachment holder block, wherein the second attachment holder block comprises a second authentication token and an address of a second attachment stored at a second remote server;

transmitting the second authentication token to the second remote server to login to the second remote server;

in response to determining that the login is unsuccessful, replacing the second attachment holder block with error information indicating that the login is unsuccessful; and transmitting the electronic mail message including the error information back to the sender device.

2. The method of claim 1, further comprising:

maintaining a list of remote servers comprising a plurality of remote servers storing attachments;

parsing a payload of the electronic mail message to locate the attachment holder block, wherein the payload comprises a plurality of attachment holder blocks, each of the plurality of attachment holder blocks associated with one of the plurality of remote servers storing attachments; and analyzing the attachment holder block to locate a respective authentication token associated with a respective remote server and a list of addresses of attachments stored at a respective remote server.

3. The method of claim 1, wherein the authentication token is obtained by the sender device after a successful login in to the remote server.

4. The method of claim 1, further comprising:

encoding the attachment prior to the replacing the attachment holder block with the attachment.

5. The method of claim 1, wherein the replacing the attachment holder block with the attachment comprises replacing a first portion of the attachment holder block with the attachment, the method further comprising:

determining that the attachment holder block further comprises an address of a second attachment stored at the remote server;

retrieving the second attachment from the remote server using the address of the second attachment and the authentication token; and attaching the second attachment to the electronic mail message by replacing a second portion of the attachment holder block with the second attachment, wherein the transmitting the electronic mail message further comprises transmitting the electronic message including the second attachment to the recipient.

6. The method of claim 1, further comprising:

maintaining a list of remote servers comprising a plurality of remote servers storing attachments;

adding a new remote server to the list of remote servers; and providing an updated list of remote servers including the new remote server to the sender device.

7. An apparatus comprising:

a processor; and a memory to store computer program instructions, the computer program instructions when executed on the processor cause the processor to perform operations comprising:

receiving an electronic mail message from a sender device, the electronic mail message comprising an attachment holder block comprising an authentication token and an address of an attachment stored at a remote server;

transmitting the authentication token to the remote server to login to the remote server to access the attachment;

retrieving the attachment from the remote server using the address of the attachment;

attaching the attachment to the electronic mail message by replacing the attachment holder block with the attachment;

transmitting the electronic mail message including the attachment to a recipient;

parsing a payload of the electronic mail message to locate a second attachment holder block, wherein the second attachment holder block comprises a second authentication token and an address of a second attachment stored at a second remote server;

transmitting the second authentication token to the second remote server to login to the second remote server;

in response to determining that the login is unsuccessful, replacing the second attachment holder block with error information indicating that the login is unsuccessful; and transmitting the electronic mail message including the error information back to the sender device.

8. The apparatus of claim 7, the operations further comprising:

maintaining a list of remote servers comprising a plurality of remote servers storing attachments;

parsing a payload of the electronic mail message to locate the attachment holder block, wherein the payload comprises a plurality of attachment holder blocks, each of the plurality of attachment holder blocks associated with one of the plurality of remote servers storing attachments; and analyzing the attachment holder block to locate a respective authentication token associated with a respective remote server and a list of addresses of attachments stored at a respective remote server.

9. The apparatus of claim 7, wherein the authentication token is obtained by the sender device after a successful login to the remote server.

10. The apparatus of claim 7, the operations further comprising:

encoding the attachment prior to the replacing the attachment holder block with the attachment.

11. The apparatus of claim 7, wherein the replacing the attachment holder block with the attachment comprises replacing a first portion of the attachment holder block with the attachment, the operations further comprising:

determining that the attachment holder block further comprises an address of a second attachment stored at the remote server;

retrieving the second attachment from the remote server using the address of the second attachment and the authentication token; and attaching the second attachment to the electronic mail message by replacing a second portion of the attachment holder block with the second attachment, wherein the transmitting the electronic mail message further comprises transmitting the electronic message including the second attachment to the recipient.

12. The apparatus of claim 7, the operations further comprising:
maintaining a list of remote servers comprising a plurality of remote servers storing attachments;
adding a new remote server to the list of remote servers; and
providing an updated list of remote servers including the new remote server to the sender device.

13. A computer readable medium storing computer program instructions, which, when executed on a processor, cause the processor to perform operations comprising:
receiving an electronic mail message from a sender device, the electronic mail message comprising an attachment holder block comprising an authentication token and an address of an attachment stored at a remote server;
transmitting the authentication token to the remote server to login to the remote server to access the attachment;
retrieving the attachment from the remote server using the address of the attachment;
attaching the attachment to the electronic mail message by replacing the attachment holder block with the attachment;
transmitting the electronic mail message including the attachment to a recipient;
parsing a payload of the electronic mail message to locate a second attachment holder block, wherein the second attachment holder block comprises a second authentication token and an address of a second attachment stored at a second remote server;
transmitting the second authentication token to the second remote server to login to the second remote server;
in response to determining that the login is unsuccessful, replacing the second attachment holder block with error information indicating that the login is unsuccessful; and
transmitting the electronic mail message including the error information back to the sender device.

14. The computer readable medium of claim 13, the operations further comprising:
maintaining a list of remote servers comprising a plurality of remote servers storing attachments;
parsing a payload of the electronic mail message to locate the attachment holder block, wherein the payload comprises a plurality of attachment holder blocks, each of the plurality of attachment holder blocks associated with one of the plurality of remote servers storing attachments; and
analyzing the attachment holder block to locate a respective authentication token associated with a respective remote server and a list of addresses of attachments stored at a respective remote server.

15. The computer readable medium of claim 13, the operations further comprising:
encoding the attachment prior to the replacing the attachment holder block with the attachment.

16. The computer readable medium of claim 13, wherein the replacing the attachment holder block with the attachment comprises replacing a first portion of the attachment holder block with the attachment, the operations further comprising:
determining that the attachment holder block further comprises an address of a second attachment stored at the remote server;
retrieving the second attachment from the remote server using the address of the second attachment and the authentication token; and
attaching the second attachment to the electronic mail message by replacing a second portion of the attachment holder block with the second attachment, wherein the transmitting the electronic mail message further comprises transmitting the electronic message including the second attachment to the recipient.

17. The computer readable medium of claim 13, the operations further comprising:
maintaining a list of remote servers comprising a plurality of remote servers storing attachments;
adding a new remote server to the list of remote servers; and
providing an updated list of remote servers including the new remote server to the sender device.

* * * * *